(12) United States Patent
Vandewege

(10) Patent No.: US 6,809,579 B2
(45) Date of Patent: Oct. 26, 2004

(54) BLOCKING MECHANISM TO REDUCE LEAKAGE CURRENT

(75) Inventor: Ivan Vandewege, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/384,231

(22) Filed: Mar. 6, 2003

(65) Prior Publication Data

US 2004/0174207 A1 Sep. 9, 2004

(51) Int. Cl.$^7$ ................................................ G05F 1/10
(52) U.S. Cl. ...................................... 327/544; 327/551
(58) Field of Search ................................ 327/530, 544, 327/551, 552, 553, 555, 559; 361/42

(56) References Cited

U.S. PATENT DOCUMENTS

| | | | |
|---|---|---|---|
| 4,833,377 A | 5/1989 | Volk, Sr. et al. | |
| 5,101,160 A | 3/1992 | Barjonnet et al. | |
| 5,659,588 A | 8/1997 | Fiedler | |
| 5,818,672 A | * 10/1998 | Hilbe | ............................ 361/43 |
| 5,841,467 A | * 11/1998 | Davidson | ..................... 725/148 |
| 6,711,446 B2 | * 3/2004 | Kirkpatrick et al. | ........... 700/19 |
| 2002/0026597 A1 | 2/2002 | Dai et al. | |
| 2002/0167351 A1 | 11/2002 | Gerber | |

* cited by examiner

Primary Examiner—Jeffrey Zweizig

(57) ABSTRACT

An electronic device of one embodiment of the invention is disclosed which includes one or more wired interconnection points and a blocking mechanism. The one or more wired interconnection points are to interconnect to other electronic devices. The blocking mechanism is situated at the one or more wired interconnect points to reduce leakage current transferred from the other electronic devices over the one or more wired interconnection points.

33 Claims, 6 Drawing Sheets

BLOCKING MECHANISM TO REDUCE LEAKAGE CURRENT

BACKGROUND

Many electronic devices include power supplies that convert high-voltage alternating current (AC) available from wall outlets to low-voltage direct current (DC). Such devices may include information technology equipment (ITE), such as computers, printers, scanners, and so on, as well as audio-video (AV) equipment, such as televisions, stereo equipment, home theatre equipment, and so on. Due to the typical characteristics of the power supplies of such electronic devices, leakage current may flow from primary sides of the power supplies that connect to the high-voltage AC, to secondary sides of the power supplies that provide the low-voltage DC.

If the leakage current of an electronic device is sufficiently high, a user touching the chassis or enclosure of the electronic device may perceive the current. Such user-perceptible touch current may cause the user to feel a tingling sensation, may shock the user, or may have worse deleterious effects. Therefore, most electronic devices are designed so that the maximum amount of leakage current is less than that which a user may perceive. Furthermore, some electronic devices may be designed to connect to the electrical ground afforded by wall outlets to which the leakage current can drain. These devices are known as class I devices, as opposed to class 11 devices that are not designed to connect to the electric ground provided by wall outlets.

Electronic devices are commonly connected to one another. For instance, printers and scanners may be connected to computers, whereas compact disc (CD) players and digital versatile disc (DVD) players are commonly connected to receivers. Leakage current, however, may be additive in nature among connected electronic devices that share a common ground plane. Although the leakage current of a single piece of equipment may be sufficiently diminutive to not cause user-perceptible touch current, such leakage current in combination with the leakage current of other pieces of equipment may result in user-perceptible touch current, causing undesirable effects.

SUMMARY

An electronic device of one embodiment of the invention includes one or more wired interconnection points and a blocking mechanism. The one or more wired interconnection points are to interconnect to other electronic devices. The blocking mechanism is situated at the one or more wired interconnect points to reduce leakage current transferred from the other electronic devices over the one or more wired interconnection points.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments of the invention which may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Overview

Figure 1A:
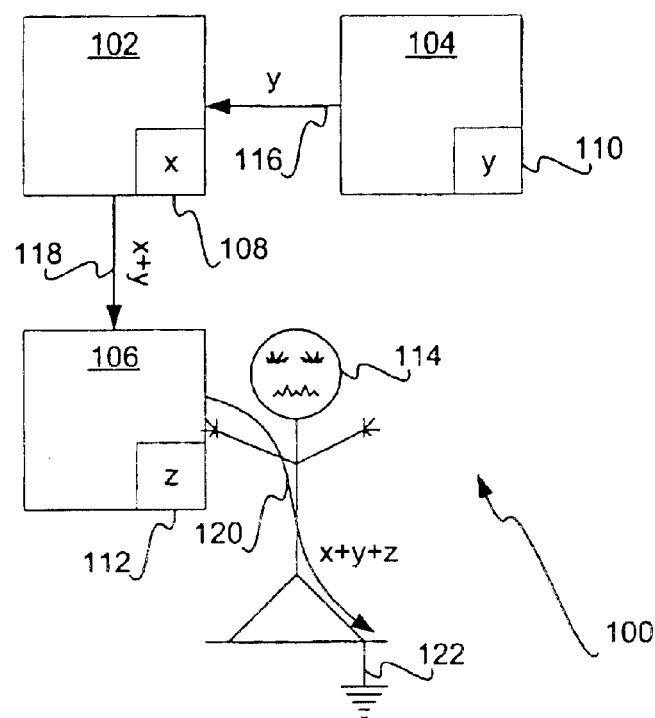
FIGS. 1A, 1B, and 1C are diagrams depicting different scenarios of the additive nature of leakage current among interconnected electronic devices, in conjunction with which at least some embodiments of the invention may be utilized.
Figure 1B:
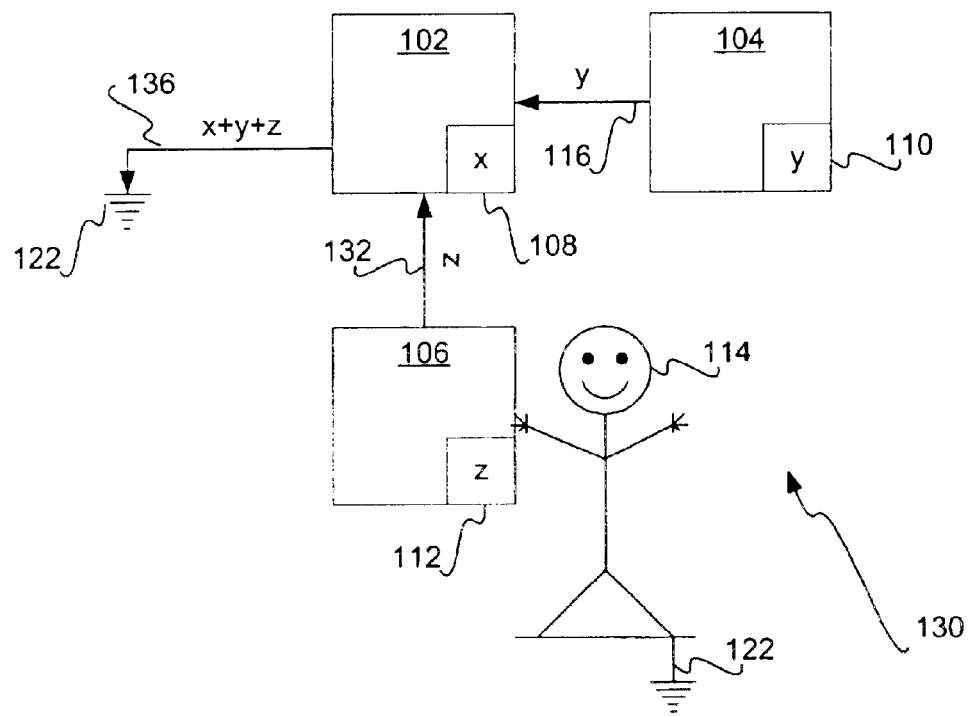
Figure 1C:
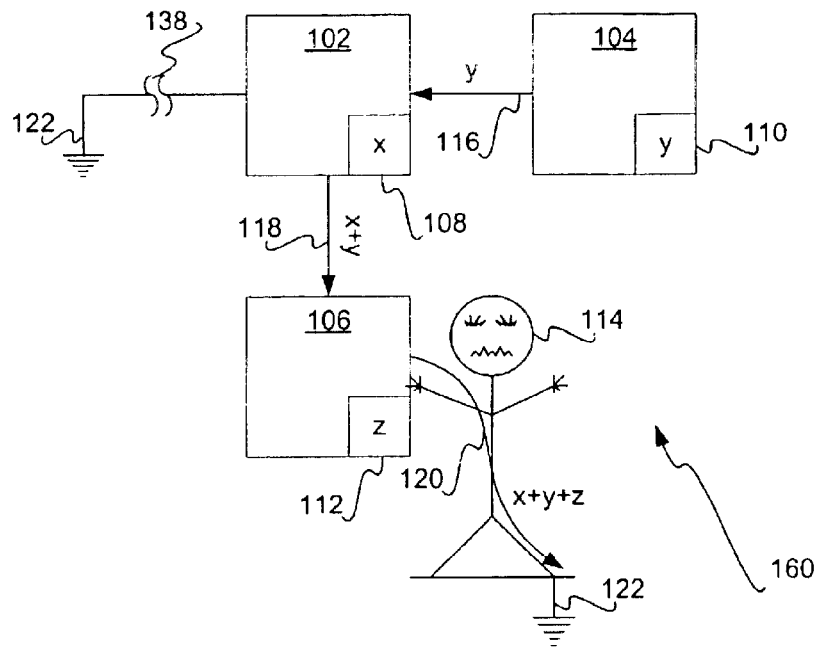

FIGS. 1A, 1B, and 1C show three scenarios 100, 130, and 160, respectively, of the additive nature of leakage current among interconnected electronic devices 102, 104, and 106, in conjunction with which at least some embodiments of the invention may be utilized. In the scenario 100 of FIG. 1A, the electronic devices 102, 104, and 106 are all class 11 devices, meaning that none of them are connected to earth ground 122. Furthermore, the device 102 is interconnected to both the electronic devices 104 and 106, such that the devices 102, 104, and 106 share a common ground plane, and a user 114 is touching the device 106. The electronic device 102 has a leakage current having a value X, as indicated by the reference number 108, the device 104 has a leakage current Y, as indicated by the reference number 110, and the device 106 has a leakage current Z, as indicated by the reference number 112. The leakage currents X, Y, and Z are each individually sufficiently low to not cause user-perceptible touch current.

Because none of the electronic devices 102, 104, and 106 are connected to the earth ground 122, the least-resistive path to the earth ground 122 is through the user 114. Thus, the leakage current Y travels from the device 104 to the device 102, as indicated by the arrow 116, where it combines with the leakage current X. The resulting leakage current X+Y travels from the device 102 to the device 106, as indicated by the arrow 118, where it combines with the leakage current Z. The final leakage current X+Y+Z travels through the user 114 to the earth ground 122, as indicated by the arrow 120. Whereas the leakage currents X, Y, and Z are each individually sufficiently low to not cause user-perceptible touch current, the combined leakage current X+Y+Z does cause user-perceptible touch current, to the detriment of the user 114.

In the scenario 130 of FIG. 1B, the electronic device 102 is now a class I device, and is connected to the earth ground 122, whereas the electronic devices 104 and 106 remain class 11 devices. The electronic device 102 is again interconnected to both the electronic device 104 and the electronic device 106, such that the devices 102, 104, and 106 share a common ground plane, and the user 114 is still touching the device 106. The least-resistive path to the earth ground 122 is now through the electronic device 102, and not through the user 114. As a result, the leakage current Y of the device 104, indicated by the reference number 110, travels to the device 102, as indicated by the arrow 116, and the leakage current Z of the device 106, indicated by the reference number 112, also travels to the device 102, as indicated by the arrow 132. At the device 102, the leakage currents Y and Z are combined with the leakage current X of the device 102, indicated by the reference number 108. The combined leakage current X+Y+Z travel to the earth ground 122, as indicated by the arrow 136, such that no user-perceptible touch current is caused.

In the scenario 160 of FIG. 1C, the electronic device 102 is still a class I device, but device 102 has not been properly connected to the earth ground 122, resulting in the open earth ground circuit, or fault, 138. Therefore, the electronic device 102 in effect becomes a class 11 device, resulting in the scenario 160 mirroring the scenario 100 of FIG. 1A instead of the scenario 130 of FIG. 1B. That is, the leakage current Y, indicated by the reference number 110, travels from the electronic device 104 to the device 102, as indicated by the arrow 116, where it combines with the leakage current X, indicated by the reference number 108. The combined leakage current X+Y travels from the device 102 to the electronic device 106, as indicated by the arrow 118, where it combines with the leakage current Z, indicated by the reference number 112. The combined leakage current X+Y+Z travels through the user 114 to the earth ground 122, as indicated by the arrow 120, resulting in user-perceptible touch current.

Figure 2:
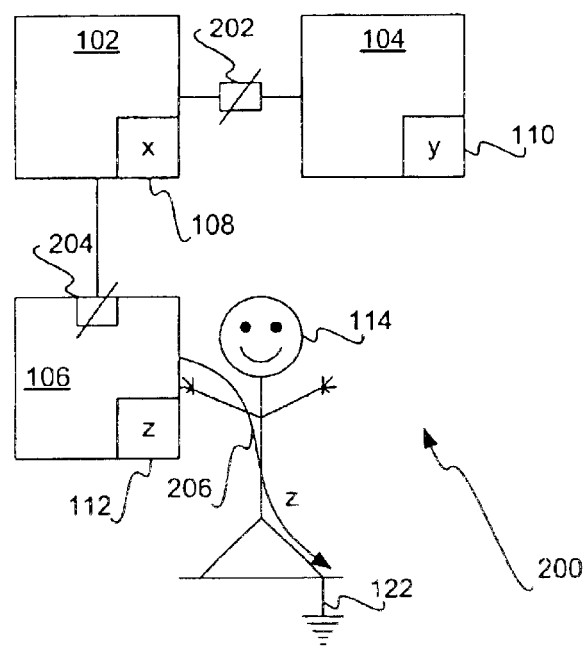
FIG. 2 is a diagram depicting an example scenario in which leakage current blocking mechanisms are present to prevent user-perceptible touch current, according to an embodiment of the invention.

FIG. 2 shows an example scenario 200 in which leakage current blocking mechanisms 202 and 204 are present to reduce or block the leakage current resulting from the combined leakage currents of the interconnected electronic devices 102, 104, and 106, according to an embodiment of the invention. The electronic device 102 is again interconnected to both the electronic device 104 and the electronic device 106, such that the devices 102, 104, and 106 share a common ground plane, and the user 114 is still touching the device 106. The devices 102, 104, and 106 may be either class I or class 11 devices, but are specifically depicted in FIG. 2 as class 11 devices or class I devices as not being properly connected to earth ground, such that they have faults. Thus, the least-resistive path to the earth ground 122 is through the user 114.

The leakage current blocking mechanism 202 is external, and has been inserted between the electronic device 102 and the electronic device 104. By comparison; the leakage current blocking mechanism 204 is internal to the electronic device 106, and has been inserted where the device 106 is interconnected to the device 102. The blocking mechanism 202 reduces or blocks the leakage current Y, indicated by the reference number 110, traveling from the device 104 to the device 102, whereas the blocking mechanism 204 reduces or blocks the leakage current X, indicated by the reference number 108, traveling from the device 102 to the device 106. Therefore, the leakage current that travels through the user 114 to the earth ground 122, as indicated by the arrow 122, is substantially comprised of the leakage current Z, indicated by the reference number 112. However, the leakage current Z is sufficiently diminutive not to result in user-perceptible touch current.

It is noted that even if the external blocking mechanism 202 were not present in the scenario 200, user-perceptible touch current would still not travel through the user 114 to the earth ground 122. The leakage current Y in such instance would travel from the electronic device 104 to the electronic device 102, where it would combine with the leakage current X. However, the combined leakage current X+Y would still be reduced or blocked by the internal blocking mechanism 204 at the electronic device 106. This means that the leakage current traveling through the user 114 to the earth ground 122 would still be substantially comprised of the leakage current Z.

Similarly, it is noted that if the internal blocking mechanism 204 were not present in the scenario 200, user-perceptible touch current from device 104 may still not travel through the user 114 to the earth ground 122. The leakage current Y in such instance would still be reduced or blocked by the external blocking mechanism 202 from traveling from the electronic device 104 to the electronic device 102. However, the leakage current X would travel from the device 102 to the electronic device 106, where it would combine with the leakage current Z. The leakage current traveling through the user 114 to the earth ground 122 thus would be the combined leakage current X+Z. If this leakage current were sufficiently great, user-perceptible touch current would result.

Electronic Device, Leakage Current Blocking Device, and Cable Assembly

Figure 3:
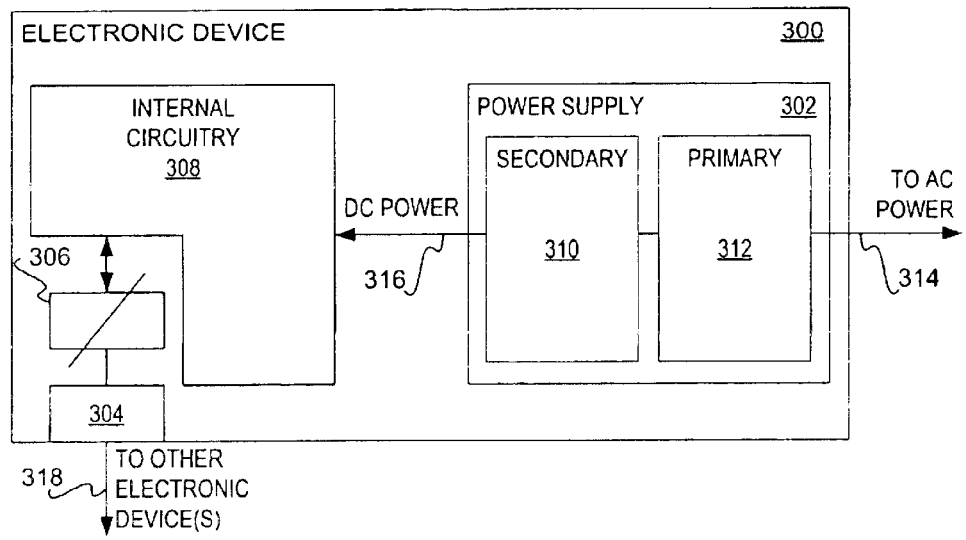
FIG. 3 is a diagram of an electronic device having an internal leakage current blocking mechanism, according to an embodiment of the invention.

FIG. 3 shows an electronic device 300 having an internal leakage current blocking mechanism 306, according to an embodiment of the invention. The electronic device 300 may be a piece of information technology equipment (ITE), such as a computer, a printer, a scanner, and so on, an audio/video (AV) device, such as a television, a piece of stereo equipment, a piece of home theatre equipment, and so on, or another type of electronic device. Besides the internal leakage current blocking mechanism 306, the electronic device 300 has a power supply 302, a wired interconnection point 304, and internal circuitry 308. The electronic device 300 may have components in addition to or in lieu of those depicted in FIG. 3, as can be appreciated by those of ordinary skill within the art.

The power supply 302 has a primary side 312 and a secondary side 310. The purpose of the power supply 302 is to receive high-voltage, alternating current (AC), as indicated by the arrow 314, and convert the high-voltage AC into low-voltage, direct current (DC) for powering the internal circuitry 308, as indicated by the arrow 316. The primary side 312 thus is coupled to the high-voltage AC, whereas the secondary side 310 is coupled to the low-voltage DC. However, leakage current can escape from the primary side 312 to the secondary side 310, and thus to the internal circuitry 308. That is, the power supply 302 may emit leakage current that may transfer to the internal circuitry 308.

The internal circuitry 308 performs the actual functionality of the electronic device 300. For instance, if the electronic device 300 were a printer connectable to a computer, the internal circuitry 308 may control a printing mechanism of the electronic device 300 in accordance with signals received from the computer. As another example, if the electronic device were a compact disc (CD) player connectable to a receiver, the internal circuitry 308 may control an optical disc mechanism of the electronic device 300 to decode the information on a CD inserted into the player and pass the information in signals to the receiver.

The internal circuitry 308 is operatively coupled to the wired interconnection point 304 through the internal leakage current blocking mechanism 306. The wired interconnection point 304 is the point at which the electronic device 300 is connectable to other electronic devices, as indicated by the arrow 318, so that the device 300 is able to communicate with these other devices. The interconnection point 304 may be a jack, a plug, a cable, and so on, and is wired in that it is a physical connection between the electronic device 300 and the other electronic devices, as opposed to a wireless connection. The interconnection point 304 thus allows the electronic device 300 to send signals to and receive signals from the other electronic devices. Such signals that are exchanged may be analog signals and/or digital signals. Only one wired interconnection point 304 is depicted in FIG. 3. However, there can be more than one wired interconnection point in the electronic device 300.

The internal leakage current blocking mechanism 306 reduces or blocks the transfer of leakage current that is internally emitted from within the electronic device 300, such as by the power supply 302, to the other electronic devices through the wired interconnection point 304. Similarly, the leakage current blocking mechanism 306 reduces or blocks the transfer of leakage current generated internally within the other electronic devices to the electronic device 300 through the wired interconnection point 304. Thus, the blocking mechanism 306 reduces or blocks the leakage current emitted within the electronic device 300 and thus reduces the additive effect of the leakage current with the leakage current from the other electronic devices, and reduces or blocks the additive effect between the external leakage current emitted by the other devices and the leakage current of the device 300. The blocking mechanism 306 is internal in that it is internal to the electronic device 300, as opposed to being an externally situated mechanism.

The leakage current that is reduced or blocked by the internal leakage current blocking mechanism 306 may be low-frequency current, whereas the signals that are intended to pass over the wired interconnection point 304 may be higher-frequency signals. As a result, the blocking mechanism 306 passes the higher-frequency signals through the interconnection point 304, while reducing the low-frequency current. More specifically, as described in more detail in the next section of the detailed description, the leakage current has a specific frequency profile, such that the blocking mechanism 306 has a transfer function matching this frequency profile to reduce or block the leakage current from passing through the mechanism 306. The blocking mechanism 306 may be a passive mechanism, made up of capacitors, resistors, inductors and other electrical components that do not use external power to operate, or may be an active mechanism, made up of at least some electrical components that use external power to operate.

Figure 4:
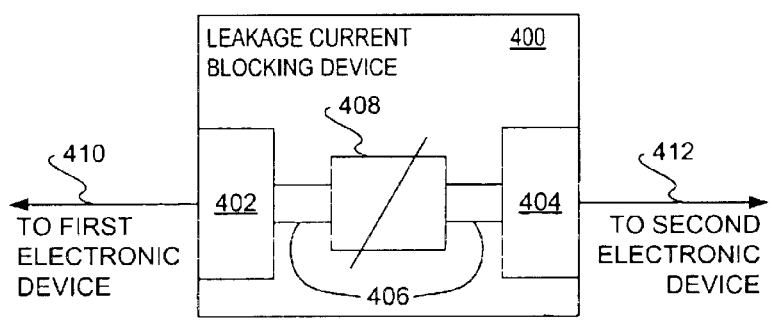
FIG. 4 is a diagram of an external leakage current blocking device, according to an embodiment of the invention.

FIG. 4 shows an external leakage current blocking device 400, according to an embodiment of the invention. Unlike the leakage current blocking mechanism 306 of FIG. 3, which is internal to the electronic device 300, the leakage current blocking device 400 of FIG. 4 is connected externally to an electronic device. The blocking device 400 includes connection points 402 and 404, an interconnect 406, and a leakage current blocking mechanism 408.

The connection point 402 is receptive to a physical, wired connection to a first electronic device, as indicated by the arrow 410, whereas the connection point 404 is receptive to a physical, wired connection to a second electronic device, as indicated by the arrow 412. Thus, the blocking device 400 is inserted in-line within a connection between a first electronic device and a second electric device. The connection point 402 receives a wired connection from the first electronic device that is intended for a second electronic device, whereas the connection point 404 receives a wired connection from the second electronic device that is intended for the first electronic device. The interconnect 406 interconnects the connection point 402 with the connection point 404, so that the first electronic device coupled to the connection point 402 is coupled to the second electronic device coupled to the connection point 404.

The leakage current blocking mechanism 408 is associated with the interconnect 406. The blocking mechanism 408 is similar or identical to the blocking mechanism 306 of FIG. 3. The blocking mechanism 408 reduces or blocks the transfer of leakage current transferred on the wired connection from the first electronic device on the connection point 402 to the wired connection to the second electronic device on the connection point 404. Likewise, the mechanism 408 reduces or blocks the transfer of leakage current transferred on the wired connection from the second electronic device on the connection point 404 to the wired connection to the first electronic device on the connection point 402. The blocking mechanism 408 thus prevents the leakage current transferred on the wired connection from the first electronic device from causing user-perceptible touch current within the second electronic device, and vice-versa.

Figure 5:
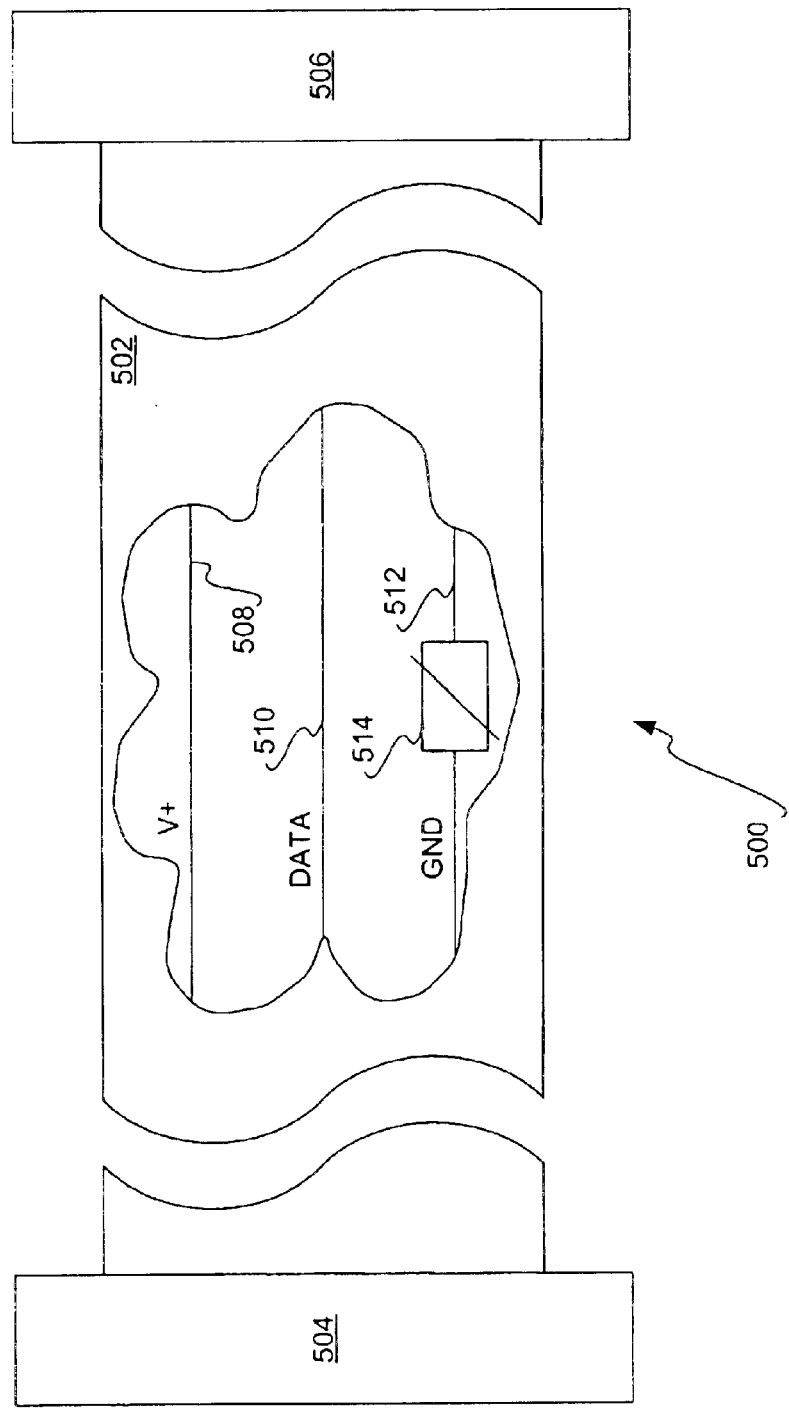
FIG. 5 is a diagram of a cable assembly having an integrated leakage current blocking mechanism, according to an embodiment of the invention.

FIG. 5 shows a cable assembly 500 that has an internal leakage current blocking mechanism 514, according to an embodiment of the invention. The blocking mechanism 514 is similar or identical to the blocking mechanisms 306 of FIG. 3 and 408 of FIG. 4. The cable assembly 500 also includes an enclosure 502 in which a power line 508, a data line 510, and a ground line 512 are situated. The cable assembly 500 ends in connection ends 504 and 506, each of which is connectable to an electronic device. Thus, the cable assembly 500 is intended to connect a first electronic device with a second electronic device, and provides functionality to reduce or block leakage current via the blocking mechanism 514. As can be appreciated by those of ordinary skill within the art, the number of type of the lines within the enclosure 502 may vary from that depicted in FIG. 5.

The leakage current blocking mechanism 514 is specifically associated with the ground line 512 in FIG. 5, but may alternatively be associated with the power line 508 and/or the data line 510 in addition to or in lieu of the ground line 512. The blocking mechanism 514 reduces or blocks the transfer of leakage current over the ground line 512, in either or both directions between the connection ends 504 and 506. Where the blocking mechanism 514 is associated with the line 508 and/or the line 510, it also reduces or blocks the transfer for leakage current over the line 508 and/or the line 510. Thus, where the connection end 504 is connected to a first electronic device and the connection end 506 is connected to a second electronic device, the mechanism 514 reduces or blocks the transfer of leakage current from the first device to the second device, and/or vice-versa.

Figure 6:
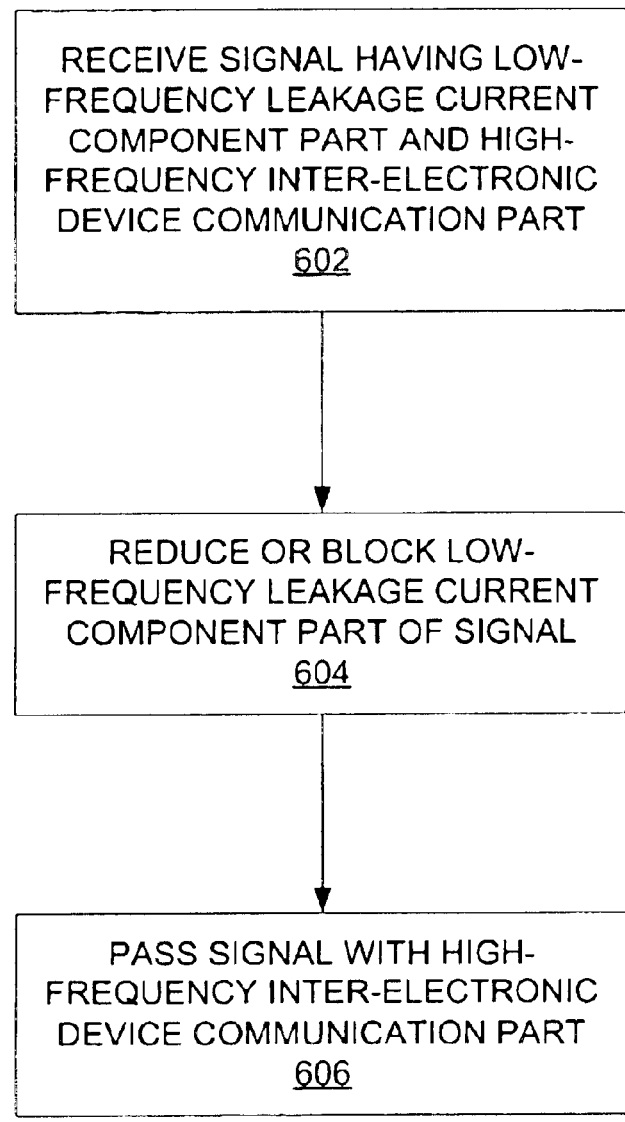
FIG. 6 is a flowchart of a method, according to an embodiment of the invention.

FIG. 6 shows a method 600, according to an embodiment of the invention. The method 600 may be performing by the blocking mechanism 306 of FIG. 3, the blocking mechanism 408 of FIG. 4, and/or the blocking mechanism 514 of FIG. 5, among other types of blocking mechanisms. A signal is received that has a low-frequency leakage current component part and a higher-frequency inter-electronic device communication part (602). The signal may have been received internally within an originating electronic device and intended for transmission to an intended electronic device, as in the embodiment of FIG. 3. Alternatively, the signal may have been received externally from the originating electronic device and intended for transmission to the intended electronic device, as in the embodiments of FIGS. 4 and 5.

The low-frequency leakage current component part of the signal is reduced or blocked (604). The substantial reduction may be accomplished in an active manner, in which powered electrical component(s) actively attenuate the leakage current, or in a passive manner, in which un-powered electrical component(s) passively attenuate the leakage current. The signal with the high-frequency inter-electronic device communication part, but with the reduced low-frequency leakage current component part, is then passed for transmission to the intended electronic device (606), which may include actual transmission of the signal to the intended electronic device.

Leakage Current and Blocking Mechanism Characteristics

Figure 7:
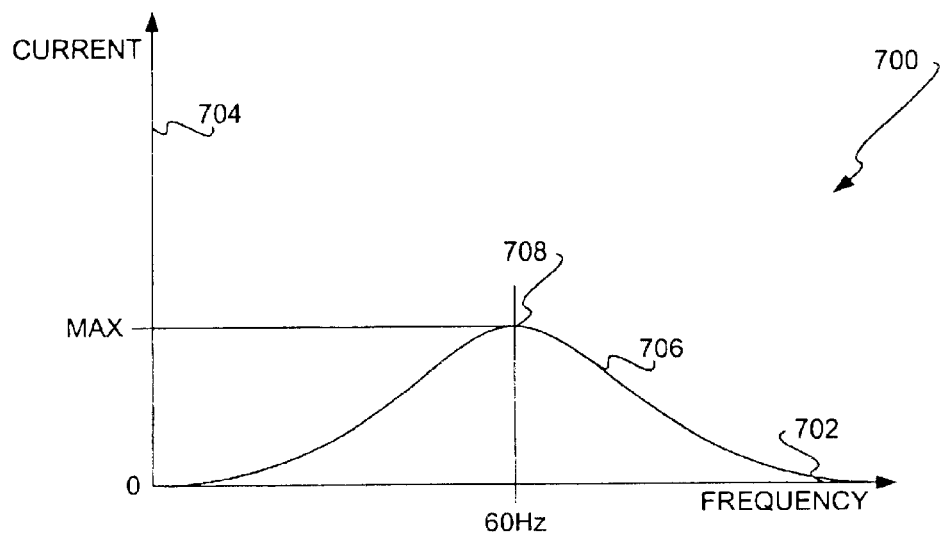
FIG. 7 is a graph of the frequency profile of low-frequency leakage current, according to an embodiment of the invention.

FIG. 7 shows a graph 700 of the frequency profile 706 of leakage current, according to an embodiment of the invention. The frequency profile 706 is mapped as current on the y-axis 704 against frequency on the x-axis 702. At the point 708, the frequency profile 706 has a maximum current level at a frequency of sixty hertz. This corresponds to leakage current that is alternating current (AC) in nature, as opposed to, for instance, the direct current (DC) that is typically used to power the internal circuitry of an electronic device, and the higher-frequency signals used to communicate between electronic devices.

Figure 8:
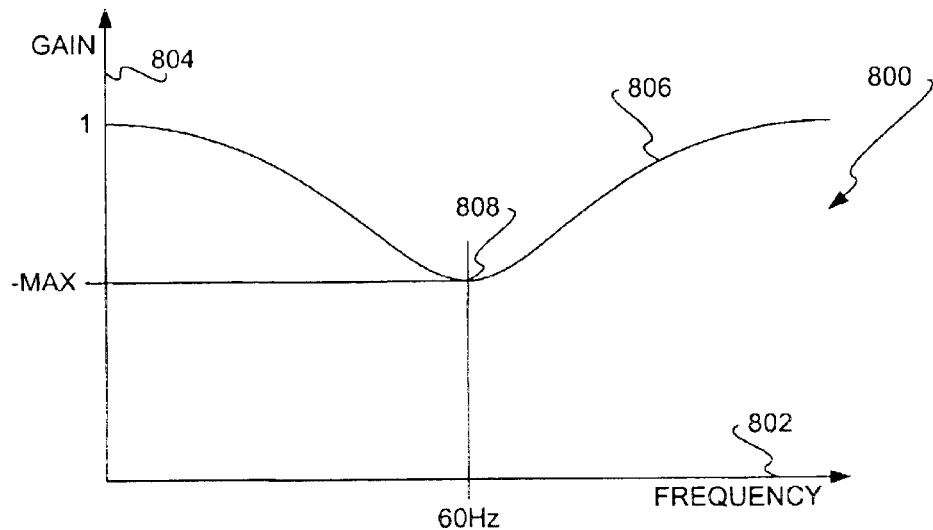
FIG. 8 is a graph of the transfer function of a leakage current blocking mechanism, according to an embodiment of the invention.

FIG. 8 shows a graph 800 of the transfer function 806 of a leakage current blocking mechanism to block the frequency profile 706 of FIG. 7, according to an embodiment of the invention. The blocking mechanism may be the blocking mechanism 306 of FIG. 3, the blocking mechanism 408 of FIG. 4, and/or the blocking mechanism 514 of FIG. 5, among other types of blocking mechanisms. The transfer function 806 is mapped as gain on the y-axis 804 against frequency on the x-axis 802. The transfer function 806 is a mirror image of the frequency profile 706, so that it reduces the leakage current having the frequency profile 706. Thus, at the point 808, the transfer function 806 has a maximum negative gain at a frequency of sixty hertz. This means that the leakage current at this frequency is at a relative-minimum, whereas other frequencies are allowed to pass.

Conclusion

It is noted that, although specific embodiments have been illustrated and described herein, it will be appreciated by those of ordinary skill in the art that any arrangement calculated to achieve the same purpose may be substituted for the specific embodiments shown., This application is intended to cover any adaptations or variations of the disclosed embodiments of the present invention. Therefore, it is manifestly intended that this invention be limited only by the claims and equivalents thereof.

What is claim is:

1. An electronic device comprising:
one or more wired interconnection points to interconnect to other electronic devices; and,
a blocking mechanism situated at the one or more wired interconnection points to reduce non-ground loop leakage current transferred from the other electronic devices over the one or more wired interconnection points without electrically isolating the electronic device from the other electronic devices.

2. The electronic device of claim 1, further comprising a power supply emitting internal leakage current, the blocking mechanism further reducing the internal leakage current from being transferring to the other electronic devices over the one or more wired interconnection points.

3. The electronic device of claim 1, wherein the leakage current is a low-frequency current, and the one or more wired interconnection points allow for higher-frequency signals to be sent to and received from the other electronic devices, such that the blocking mechanism passes the higher-frequency signals through the one or more wired interconnection points while reducing the low-frequency current.

4. The electronic device of claim 1, wherein the leakage current has a frequency profile, and the blocking mechanism has a transfer function matching the frequency profile of the leakage current.

5. The electronic device of claim 1, wherein the one or more wired interconnection points allow the electronic device to communicate with the other electronic devices.

6. The electronic device of claim 1, wherein the one or more wired interconnection points allow the electronic device to send signals to and receive signals from the other electronic devices.

7. The electronic device of claim 1, wherein the one or more wired interconnection points allow for at least one of analog signals and digital signals to be exchanged with the other electronic devices.

8. The electronic device of claim 1, wherein the blocking mechanism prevents the leakage current transferred from the other electronic devices over the one or more wired interconnection points from additively affecting internal leakage current emitted by the electronic device at the electronic device.

9. The electronic device of claim 1, wherein the blocking mechanism prevents internal leakage current emitted by the electronic device from additively affecting the leakage current at the other electronic devices.

10. The electronic device of claim 1, wherein the blocking mechanism is one of: a passive filter and an active filter.

11. The electronic device of claim 1, wherein the electronic device is one of information technology equipment and audio/video equipment.

12. An electronic device comprising:
a power supply to emit non-ground loop leakage current;
one or more wired interconnection points to interconnect to other electronic devices; and,
a blocking mechanism situated at the one or more wired interconnection points to reduce the non-around loop leakage current transferred to the other electronic devices over the one or more wired interconnection points without electrically isolating the electronic device from the other electronic devices.

13. The electronic device of claim 12, wherein the blocking mechanism further reduces external leakage current transferred from the other electronic devices over the one or more wired interconnection points.

14. The electronic device of claim 12, wherein the blocking mechanism reduces an additive effect between the leakage current emitted by the power supply and leakage current at the other electronic devices.

15. The electronic device of claim 12, wherein the blocking mechanism reduces an additive effect between external leakage current transferred from the other electronic devices over the one or more wired interconnection points and leakage current emitted by the power supply at the electronic device.

16. An electronic device comprising:

one or more wired interconnection points to interconnect to other electronic devices; and, means for reducing non-ground loop leakage current transferred from the other electronic devices over the one or more wired interconnection points from causing user-perceptible touch current within the electronic device without electrically isolating the electronic device from the other electronic devices.

17. The electronic device of claim 16, wherein the means is further for reducing internal leakage current emitted by the electronic device from causing user-perceptible touch current within the other electronic devices.

18. The electronic device of claim 17, wherein the means reduces the internal leakage current transferred to the other electronic devices over the one or more wired interconnection points.

19. The electronic device of claim 16, wherein the means reduces the leakage current transferred from the other electronic devices over the one or more wired interconnection points.

20. A leakage current blocking device comprising:

a first connection point to receive a wired connection from a first electronic device intended for a second electronic device, the leakage current blocking device external to the first electronic device;

a second connection point to receive a wired connection from a second electronic device intended for the first electronic device the leakage current blocking device external to the second electronic device;

an interconnect interconnecting the first connection point and the second connection point; and, a blocking mechanism associated with the interconnect to block non-ground loop leakage current transferred on the wired connection from the first electronic device from being transferred to the second electronic device and to block leakage current transferred on the wired connection from the second electronic device from being transferred to the first electronic device.

21. The leakage current blocking device of claim 20, wherein the first connection point corresponds to a connection point on the second electronic device receptive to the wired connection from the first electronic device, and the second connection point corresponds to a connection point on the first electronic device receptive to the wired connection from the second electronic device.

22. The leakage current blocking device of claim 20, wherein the blocking mechanism prevents the leakage current transferred on the wired connection from the first electronic device from causing user-perceptible touch current within the second electronic device.

23. The leakage current blocking device of claim 20, wherein the blocking mechanism prevents the leakage current transferred on the wired connection from the second electronic device from causing user-perceptible touch current within the first electronic device.

24. A cable assembly comprising:

an enclosure;

one or more data lines situated within the enclosure;

a ground line situated within the enclosure; and, a blocking mechanism associated with the ground line to reduce leakage current transfer over the ground line.

25. The cable assembly of claim 24, further comprising a power line, such that the blocking mechanism is further associated with the power line to reduce leakage current transfer over the power line.

26. The cable assembly of claim 24, wherein the blocking mechanism is further associated with the one or more data lines to reduce leakage current transfer over the one or more data lines.

27. The cable assembly of claim 24, further comprising a first end connectable to a first electronic device and a second end connectable to a second electronic device, the blocking mechanism is further to reduce leakage current transfer from the first electronic device to the second electronic device.

28. The cable assembly of claim 27, wherein the blocking mechanism is further to reduce leakage current transfer from the second electronic device to the first electronic device.

29. A method comprising:

receiving a signal from a first electronic device, the signal having a low-frequency non-ground loop leakage current component part and a higher-frequency inter-electronic device communication part;

reducing the low-frequency non-ground loop leakage current component part of the signal without electrically isolating the first electronic device from a second electronic device; and, passing the signal with the higher-frequency inter-electronic device communication part remaining for transmission to the second electronic device.

30. The method of claim 29, wherein receiving the signal comprises receiving the signal internally within first electronic device and intended for transmission to the second electronic device.

31. The method of claim 29, wherein receiving the signal comprises receiving the signal externally from the first electronic device and intended for transmission to the second electronic device.

32. The method of claim 29, wherein reducing the low-frequency leakage current component part of the signal comprises one of actively reducing the low-frequency leakage current component part of the signal and passively reducing the low-frequency leakage current component part of the signal.

33. The method of claim 29, wherein passing the signal with the higher-frequency inter-electronic device communication part remaining comprises transmitting the signal with the higher-frequency inter-electronic device communication part remaining to the second electronic device.

* * * * *